US008526108B2

(12) United States Patent
Weinold et al.

(10) Patent No.: US 8,526,108 B2
(45) Date of Patent: Sep. 3, 2013

(54) IMAGE SYSTEM WITH DIFFUSED IMAGING SCREEN AND METHOD OF MANUFACTURE

(75) Inventors: Chris Weinold, Oceanside, CA (US); Richard O'Hara, San Diego, CA (US)

(73) Assignee: Palomar Display Products, Inc., Carlsbad, CA (US)

( * ) Notice: Subject to any disclaimer, the term of this patent is extended or adjusted under 35 U.S.C. 154(b) by 0 days.

(21) Appl. No.: 13/348,910

(22) Filed: Jan. 12, 2012

(65) Prior Publication Data

US 2012/0182610 A1 Jul. 19, 2012

Related U.S. Application Data

(63) Continuation-in-part of application No. 13/249,847, filed on Sep. 30, 2011.

(60) Provisional application No. 61/388,122, filed on Sep. 30, 2010, provisional application No. 61/433,143, filed on Jan. 14, 2011.

(51) Int. Cl.
*G02B 27/14* (2006.01)

(52) U.S. Cl.
USPC .......................................... 359/460; 359/443

(58) Field of Classification Search
CPC .................................. G02B 27/14; G09G 5/00
USPC ......................................... 359/630, 443–461
See application file for complete search history.

(56) References Cited

U.S. PATENT DOCUMENTS

| | | | | |
|---|---|---|---|---|
| 5,151,823 A * | 9/1992 | Chen | | 359/565 |
| 5,517,263 A * | 5/1996 | Minich et al. | | 353/31 |
| 5,563,710 A | 10/1996 | Webb et al. | | |
| 5,777,789 A | 7/1998 | Chiu et al. | | |
| 5,971,545 A | 10/1999 | Haitz | | |
| 5,975,703 A | 11/1999 | Holman et al. | | |
| 6,224,216 B1 | 5/2001 | Parker et al. | | |
| 6,447,120 B1 | 9/2002 | Hansen et al. | | |
| 6,661,475 B1 * | 12/2003 | Stahl et al. | | 349/9 |
| 6,864,861 B2 * | 3/2005 | Schehrer et al. | | 345/7 |
| 6,972,735 B2 * | 12/2005 | Hebert | | 345/8 |
| 7,104,652 B2 | 9/2006 | Kojima | | |
| 7,125,121 B2 | 10/2006 | Miyagaki et al. | | |
| 7,196,849 B2 * | 3/2007 | McGuire et al. | | 359/630 |
| 7,417,794 B2 * | 8/2008 | Browning | | 359/452 |
| 7,547,103 B2 | 6/2009 | McDowall et al. | | |
| 7,855,833 B2 * | 12/2010 | Harada et al. | | 359/453 |
| 8,014,066 B2 * | 9/2011 | Teather et al. | | 359/449 |
| 2005/0286135 A1 * | 12/2005 | Weissman et al. | | 359/630 |
| 2006/0018025 A1 | 1/2006 | Sharon et al. | | |
| 2009/0195872 A1 | 8/2009 | Yonekubo et al. | | |

\* cited by examiner

*Primary Examiner* — Clayton E LaBalle
*Assistant Examiner* — Kevin Butler
(74) *Attorney, Agent, or Firm* — Roberts IP Law; John Roberts

(57) ABSTRACT

Provided are diffused but transmissive optical image projection screens and methods of their manufacture, including screens comprising acetal polymers such as polyoxymethylene. Such screens may be used in various applications, including but not limited electronic image display and control system comprising in various embodiments a microdisplay video projector that projects a high quality color image from a non-CRT image source onto a diffused but transmissive optical projection screen that is optically coupled with and viewable through a biocular adapted to this purpose. Systems are disclosed that are adapted to be mechanically coupled with a user to prevent relative movement between the biocular and the user, for instance in tactical applications. Closed-loop control electronics are provided for automatically controlling the brightness and chromaticity of the image.

20 Claims, 10 Drawing Sheets

IMAGE SYSTEM WITH DIFFUSED IMAGING SCREEN AND METHOD OF MANUFACTURE

CROSS-REFERENCE TO RELATED APPLICATIONS

This application claims the benefit of U.S. Provisional Application No. 61/388,122, filed Sep. 30, 2010, and U.S. Provisional Application No. 61/433,143, filed Jan. 14, 2011, and U.S. Regular Utility Application No. 13/249,847, filed Sep. 30, 2011.

FEDERALLY SPONSORED RESEARCH OR DEVELOPMENT

None.

TECHNICAL FIELD

The present invention relates to diffused but transmissive optical image projection screens and methods of their manufacture, including screens comprising acetal polymers such as polyoxymethylene. Such screens may be used in various applications, including but not limited to image display and control systems adapted to produce high resolution color imagery optically coupled with a biocular.

BACKGROUND

A biocular is an optical system that produces an image that a user can view with both eyes. Biocular systems have been used as a means to magnify an electronically generated image, such as an image produced by a cathode ray tube (CRT). An example biocular is described in U.S. Pat. No. 5,151,823 to Chen, issued Sep. 29, 1992 (hereafter "Chen"), the entirety of which is incorporated herein by reference as if fully set forth herein. Bioculars have been used in head-up and head-down displays in modern military vehicles such as tanks and other armored vehicles, military and commercial aircraft, flight simulators, microscopes used to inspect semiconductor devices, and medical applications. Various video sources may be used to generate images that are displayed by a biocular, such as thermal imaging systems, day sight video cameras, night vision systems, and computer generated graphics, among others. An advantage of using a biocular eyepiece in a display system, as compared to a monocular eyepiece or a binocular eyepiece, is that the observer is able to freely move her or his head and use both eyes to see essentially the same image at the same light level on the same optical system. However, unconstrained movement between the user and the display can become a problem in tactical applications, where an image may need to be viewed carefully while the user is moving, for instance during combat.

Displays that use a biocular can offer the additional advantage of presenting a large virtual image to both eyes of the viewer from a small real image source, such as a very small cathode ray tube ("CRT"). Use of a very small CRT allows the overall package of the system to be compact in size, which is an important attribute in tactical applications such as aircraft, military vehicles and the like, where space is limited.

Tactical image display systems typically use a small monochromatic CRT as the active display element. However, small monochrome CRT's are unable to display color images and are generally limited in resolution and the ability to display high definition video imagery. These deficiencies severely limit the ability of such systems to support applications that require presentation of high quality color imagery. Accordingly, a need exists for an improved image display system, including one that is compact, efficient, reliable, and adapted to produce high-quality and high-resolution color images, and particularly one that is compatible with high definition color video sources, including digital sources. A need also exists for an improved image display system that is specially adapted to be used in tactical applications, where an image may need to be viewed carefully while the user is moving, for instance during combat.

In connection with optically coupled magnifying lens cells as discussed above as well as others, a need exists for an improved diffused but transmissive optical image projection screen adapted for use as a small (e.g., 1.62 inch×0.91 inch), yet high resolution (e.g., 1280×768, 1920×1080 or others) screen.

One of the biggest challenges facing the development of a small, high-resolution diffused but transmissive optical image projection screen, also known as a rear projection screen, is finding a suitable screen material with optical qualities that work well for this usage. Although there are numerous commercially available optical projection screen materials, most are designed for large projected images. Furthermore, the few materials advertised for use as a small, diffused but transmissive optical image projection screen do not work well at providing a clear, high resolution image without artifacts or other undesirable characteristics when used on a small rear projection image screen.

SUMMARY

The present invention solves these problems by providing screen materials and methods of manufacture that can be used to form small, diffused but transmissive optical image projection screens that provide clear, high resolution images without artifacts or other undesirable characteristics. It was only after testing numerous commercially available projection screen materials and other choices that the present inventors extended their research to materials not intended for this type of application. This included testing numerous types of plastics, paints, coatings, and liquid crystals. In the course of this research, the inventors unexpectedly discovered that polyoxymethylene and similar acetal materials worked surprisingly well as screen materials for these applications, even though these materials are not designed for this purpose and are typically used as lightweight and strong replacements for metal parts used in mechanical assemblies. Testing of these materials provided surprising, unexpected and unique results that have allowed the inventors to realize their goal of producing an improved diffused but transmissive optical image projection screen that is both small and capable of providing high-resolution color images.

Accordingly, provided is a diffused but transmissive optical image projection screen that works very well with small high resolution optical images.

In another aspect, provided is the use of a material not originally designed or intended for use as an optical image projection screen.

An additional aspect is the use of materials commonly known as Acetal, Polyoxymethylene, Polyacetal or Polyformaldehyde for an optical image projection screen.

In further aspects, provided is the use of a copolymer known by the trade name Celcon or a homopolymer known by the trade name Delrin for an optical image projection screen.

In a further aspect, provided is a diffused but transmissive optical image projection screen comprising commercially available thin film Acetal typically used as a friction reduction surface between mechanical parts.

In a further aspect, provided is a diffused but transmissive optical image projection screen comprising commercially available Acetal that has been formed, rolled, and cut in a manner to insure a smooth even surface with consistent thickness and the desired optical light diffusion and transmission properties.

In a further aspect, provided is a diffused but transmissive optical image projection screen suitable for use in a variety of applications including but not limited to small optical projection screens.

In a further aspect, provided is a diffused but transmissive optical image projection screen suitable for use in applications including but not limited to military display systems utilizing an optically coupled magnifying lens cell.

In a further aspect, provided is a diffused but transmissive optical image projection screen suitable for use in a variety of applications including but not limited to a direct view optical projection screen.

In a further aspect, provided is a diffused but transmissive optical image projection screen suitable for use in applications including but not limited to automotive and aircraft instrumentation and displays.

In a further aspect, provided is a diffused but transmissive optical image projection screen suitable for use in applications including but not limited to simulators and training systems.

In a further aspect, provided is a diffused but transmissive optical image projection screen suitable for use in applications including but not limited to commercial, industrial, military, and medical products.

In yet a further aspect, provided is an optical light diffusing screen suitable for use in diffused lighting systems including but not limited to area lighting and specialty lamps.

In a further aspect, provided is an optical light diffusing screen suitable for use in applications including but not limited to commercial, industrial, military, and medical products.

Further details regarding example embodiments of the invention are provided below with reference to the accompanying example figures. Additional aspects, alternatives and variations as would be apparent to persons of skill in the art are also disclosed herein and are specifically contemplated as included as part of the invention, which is limited not by any example but only by the claims.

BRIEF DESCRIPTION OF THE DRAWINGS

The following figures illustrate certain aspects of the design and utility of example embodiments of the invention.

DETAILED DESCRIPTION OF EXAMPLE EMBODIMENTS

Figure 1:
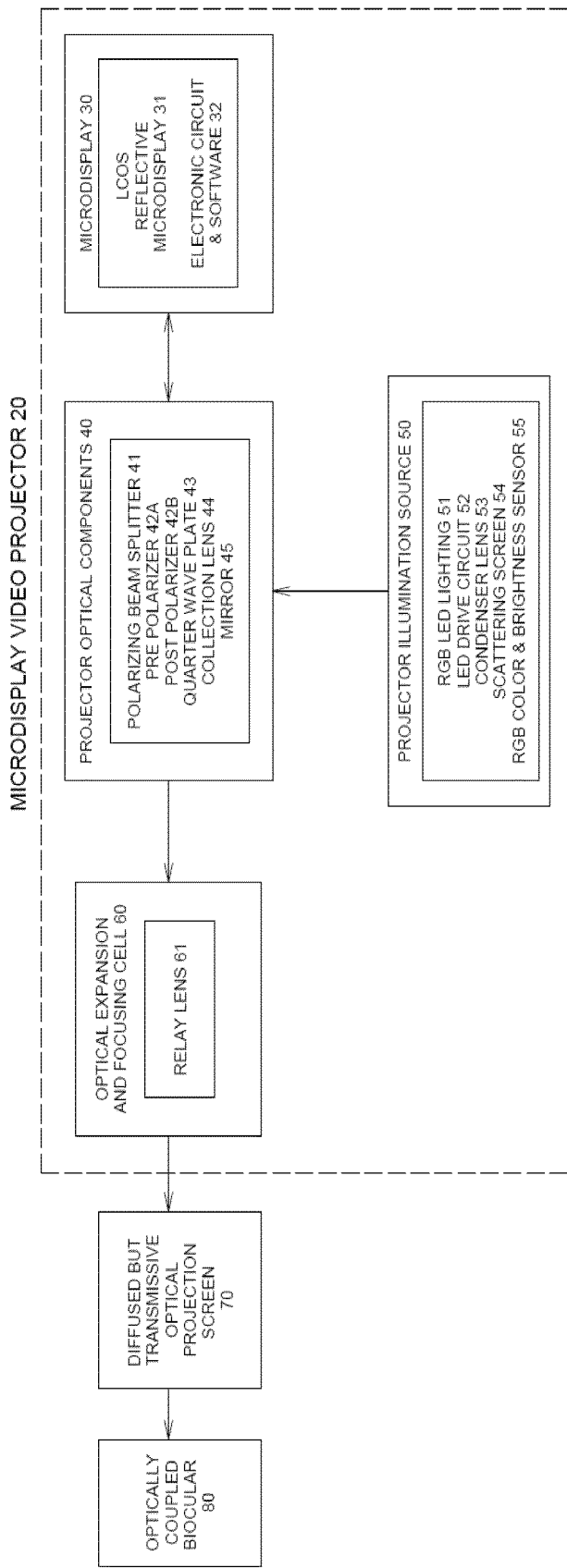
FIG. 1 is a block diagram showing aspects of an example embodiment of an image system adapted to utilize a diffused imaging screen according to the invention.
Figure 2:
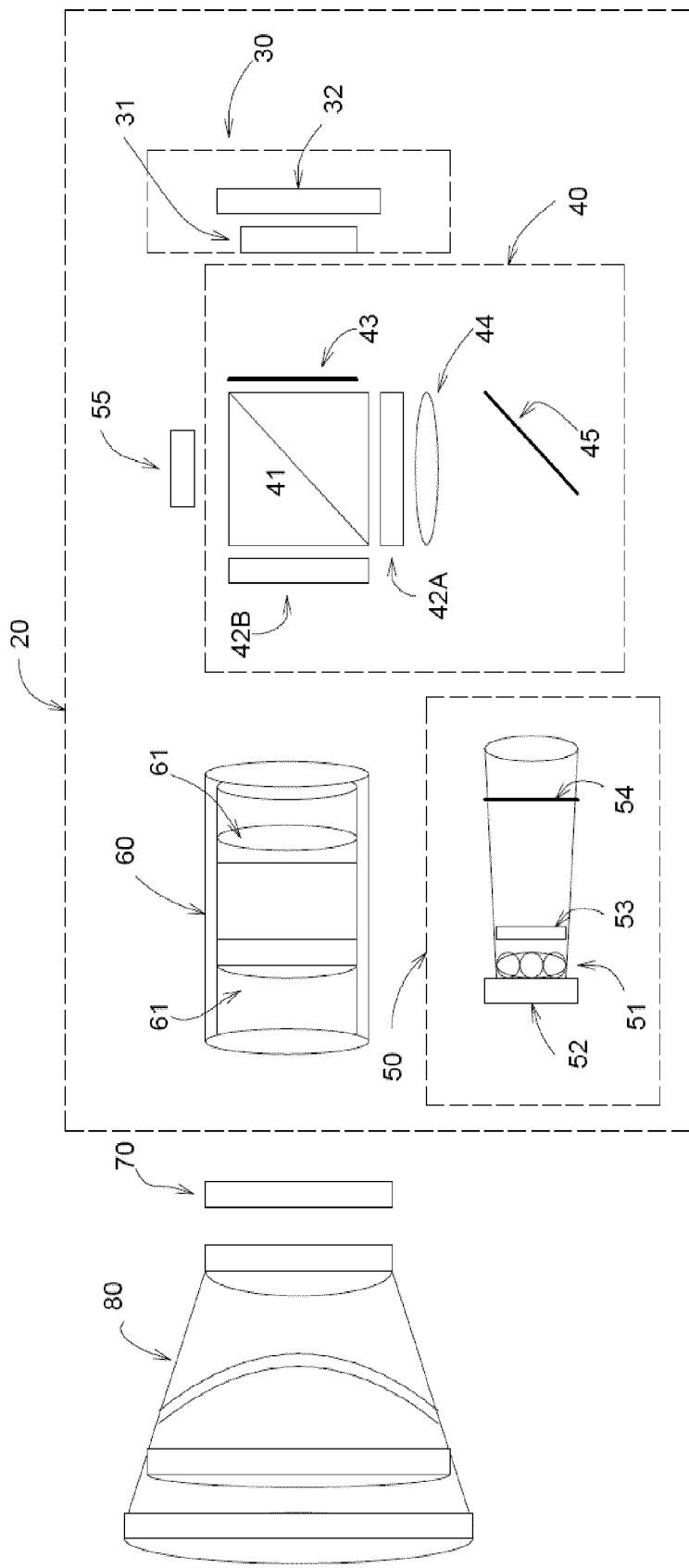
FIG. 2 is an exploded top plan view of certain components of an example embodiment of an image system adapted to utilize a diffused imaging screen according to the invention.
Figure 3:
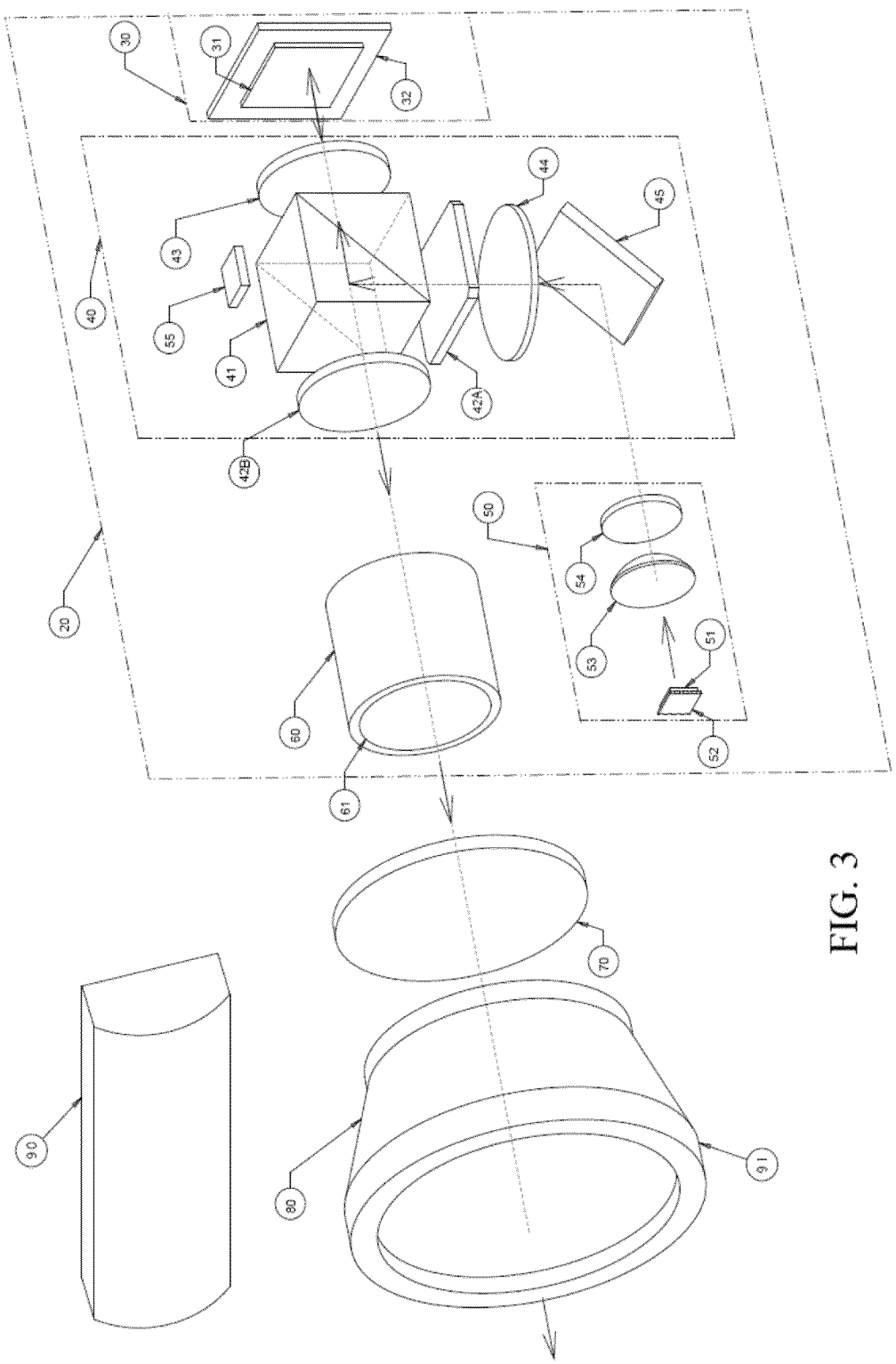
FIG. 3 is an exploded perspective view of certain components of an example embodiment of an image system adapted to utilize a diffused imaging screen according to the invention.
Figure 4:
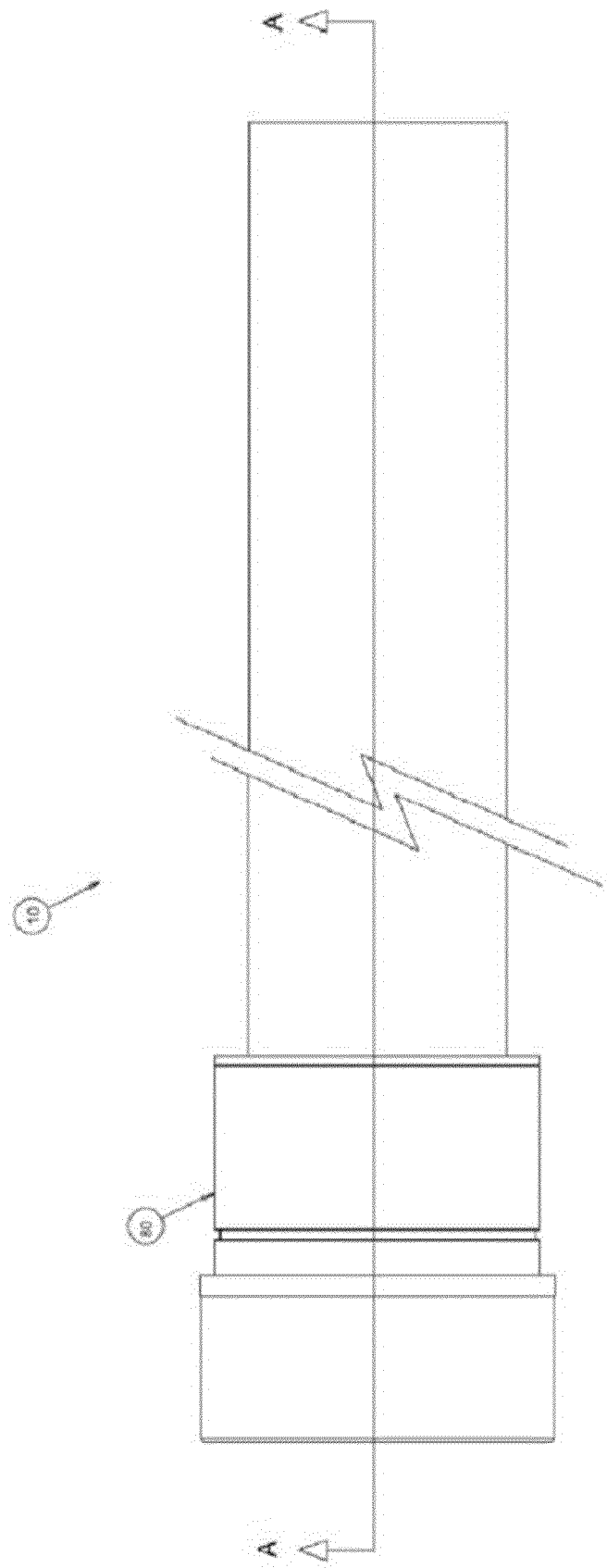
FIG. 4 is a right side view of an example embodiment of an image system adapted to utilize a diffused imaging screen according to the invention.

Example aspects, components and features of various embodiments of image systems 10 adapted to present high resolution color imagery are illustrated in FIGS. 1 through 10 and are described below. As shown in FIGS. 1-3, example image control and display systems 10 may comprise a microdisplay video projector 20 that projects an image onto a diffused but transmissive optical projection screen 70, which is optically coupled with and may be attached with a biocular 80, that in certain embodiments is adapted to be mechanically coupled with a user.

Example microdisplay video projectors 20, may comprise one or more microdisplay assemblies 30, various projector optical components 40, one or more projector illumination sources 50, and one or more optical expansion and/or focusing cells 60. Other microdisplay video projectors 20 suitable for this application may comprise fewer or additional components or elements as appropriate and as would be apparent to persons of skill in the art.

Figure 5:
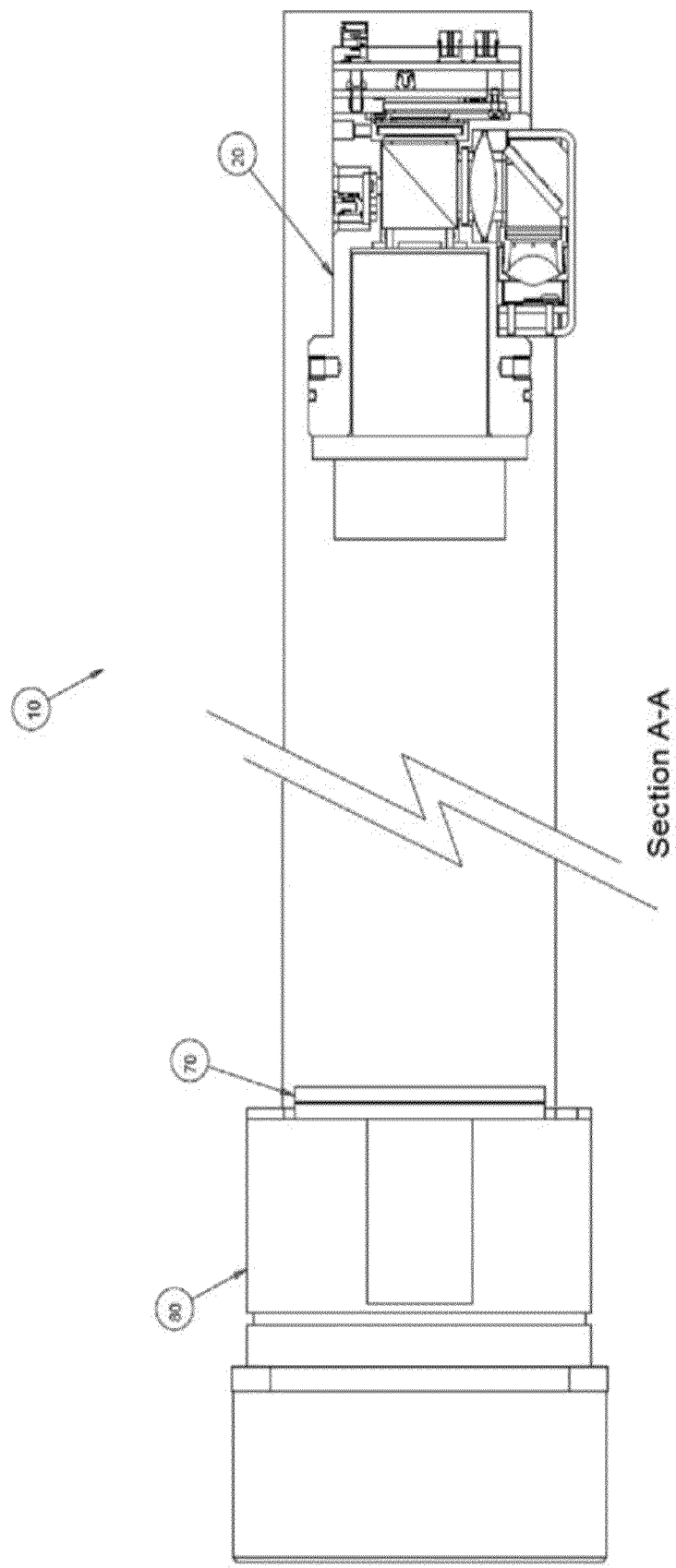
FIG. 5 is a top plan section view of the example image system shown in FIG. 4, with section lines omitted for clarity.
Figure 6:
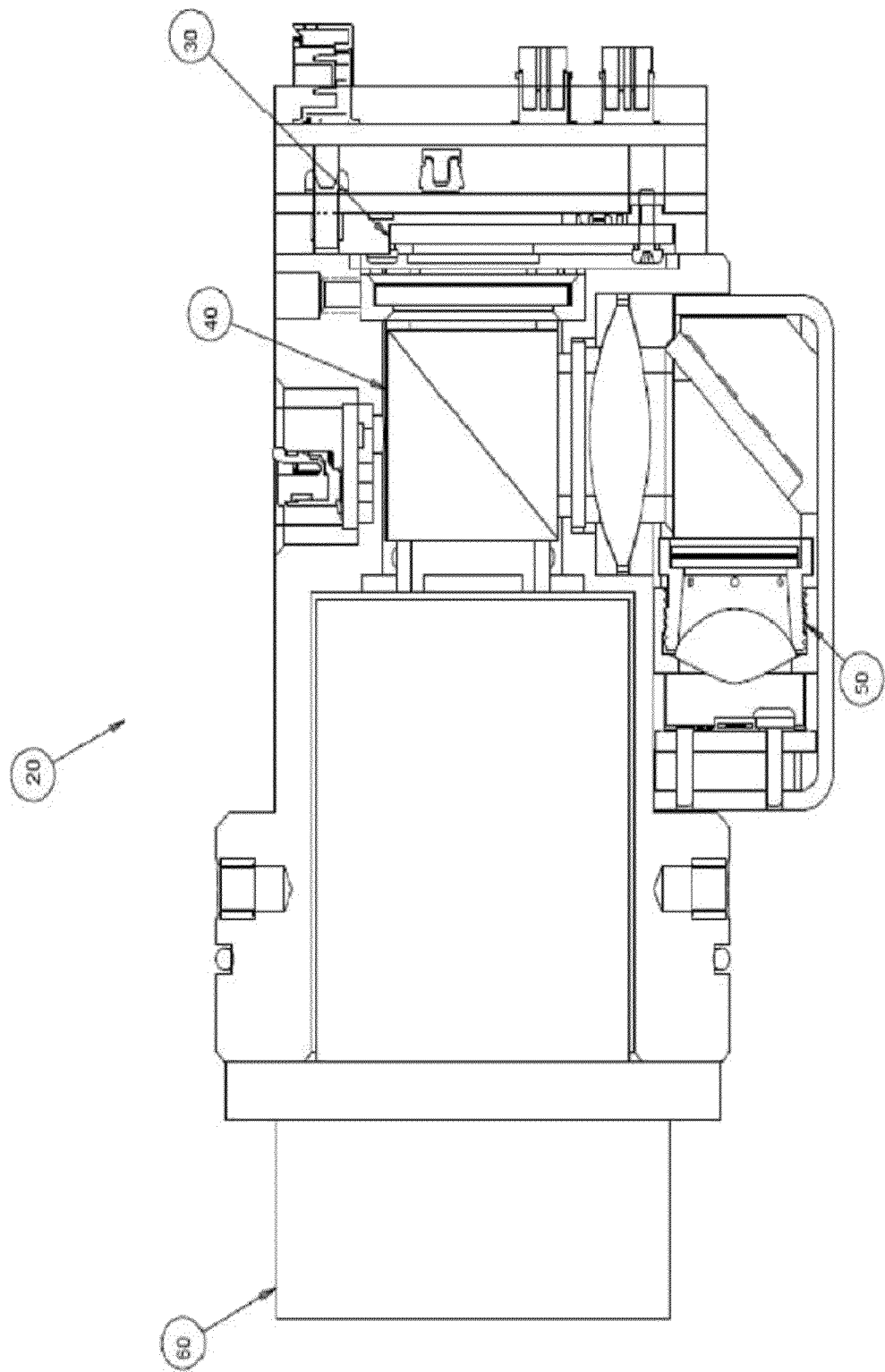
FIG. 6 is a top plan section view of the example microdisplay video projector shown in FIG. 5, with section lines omitted for clarity.

FIG. 5 shows the relative scale of certain major components of an example image system 10, including a microdisplay video projector 20, diffused but transmissive optical projection screen 70, and biocular 80. FIG. 6 indicates the relative scale of various components of an example microdisplay video projector 20, including projector illumination source 50, optical components 40, and optical expansion and focusing cell 60. Details regarding these example components and how light travels through them to create high quality color images are provided below.

Example Light Path

With reference to FIG. 3, the path of light through an example image system 10 will now be described. Note that the following description is just an example, however; other examples may use substantially different designs and/or light paths and still fall within the scope of the invention, which is limited not by any examples but only by the claims. Projector illumination source 50 produces light, such as sequential red, green and blue ("RGB") lighting. RGB light emissions from the projector illumination source 50 may be synchronized with and directed to corresponding presentations of RGB images on reflective microdisplay assembly 30. This may be accomplished in the following example embodiment as follows. Light from the RGB lighting 51 is collected and concentrated by condensing lens 53 and directed towards scattering screen 54. After passing through scattering screen 54, the now concentrated and spatially uniform light source is directed at angled or "folding" mirror 45. Folding mirror 45 collects light from illumination source 50 and reflects it at an approximately 90 degree angle or other angle appropriate to provide a flat field illumination to collection lens 44 and pre-polarizer 42A. Collection lens 44 collects and concentrates the light as it passes through to pre-polarizer 42A. Pre polarizer 42A polarizes light by blocking or reflecting light having a first polarity and transmitting light having a second polarity. This polarized light then exits pre-polarizer 42A and enters polarizing beam splitter 41.

Light having a second polarity and entering polarizing beamsplitter 41 from pre-polarizer 42A is internally reflected and directed towards microdisplay assembly 30 as shown in FIG. 3. Specifically, polarizing beamsplitter 41 collects light having a second polarity from pre-polarizer 42A and reflects it at an approximately 90 degree angle or other angle appropriate to provide a flat field illumination to quarter wave plate 43. Reflected light having a second polarity thus exits polarizing beamsplitter 41 and its polarity is then conditioned or reinforced by traveling through quarter wave plate 43. Not all light entering polarizing beamsplitter 41 from illumination source 50 is effectively reflected towards quarter wave plate 43. Some light from illumination source 50, passes straight through polarizing beam splitter to strike the surface of color and brightness sensor 55.

Light exiting quarter wave plate 43 then impinges the front surface of microdisplay assembly 30 and is selectively reflected by each pixel of reflective microdisplay 31 to form an image. More specifically, each pixel of reflective microdisplay 31 corresponds to a pixel of the digital image to be presented and is controlled by an array of electrodes (not shown). For example, each pixel of the reflective microdisplay 31 may be controlled to modulate light directed at the surface of the reflective microdisplay 31 to represent the relative intensity of the corresponding pixel of the video image to be displayed. Moreover, in this example embodiment, reflective microdisplay 31 changes the polarity of all the light it reflects so that the reflected light has a new, third polarity (which may or may not be the same as the first polarity) that allows the light to pass straight through polarizing beam splitter 41 without being blocked or reflected.

Accordingly, modulated light reflected from microdisplay assembly 30 passes straight back through quarter wave plate 43, through polarizing beamsplitter 41, and through postpolarizer 42B, toward optical expansion and focusing cell 60.

Light entering optical expansion and focusing cell 60 encounters relay lens 61. Relay lens 61 by way of optical lenses serves to collect and focus light towards a fixed real image focal plane, where the diffused but transmissive optical projection screen 70 is located. Diffused but transmissive optical projection screen 70 provides a real image plane upon which to focus and present the image provided by microdisplay assembly 30 by way of optical components 40 and optical expansion and focusing cell 60.

The image presented on the diffused but transmissive optical projection screen 70 may provide a high resolution color image plane appropriately sized and suitable for use with a biocular 80. For example, diffused but transmissive optical projection screen 70 can be placed at the input aperture of a biocular 80.

Biocular 80 provides the means to magnify the video image on the diffused but transmissive optical projection screen 70, and presents this image to both eyes of the user as a large virtual image at infinite focus.

Example Projector Illumination Sources

With continued reference to FIG. 3, example projector illumination sources 50 will now be described. In certain embodiments projector illumination source 50 provides the light used to illuminate reflective microdisplay assembly 30. Projector illumination source 50 may in various embodiments include, any or all of the following elements: red, green and blue ("RGB") light emitting diode ("LED") lighting 51; LED lighting control electronics 52; one or more condenser lenses 53; one or more scattering screens 54; and one or more sensors 55, such as, by way of example and not limitation, RGB color and brightness sensors 55.

Lighting such as RGB LED lighting 51, may comprise for example one or more solid-state LED corresponding to each RGB color. RGB LED's may be mounted on a heat conducting and dissipating circuit board or other suitable surface. RGB LED's may be placed close together to approximate a single point light source. An example of RGB LEDs that may be suitable for use in various embodiments are available from Osram, Sylvania Inc. of Danvers, Mass. as part number LE ATB S2W-JW-1+LBMB-24+G. Although this particular part is a monolithic type device with the RBG LED's mounted in a single package, other package options may be used and are available, including single color LEDs. For example, a monochromatic spatial light system may be provided by only turning on single color LED's or by simultaneously turning on all three LED's to create a substantially white light source. Additionally, adjusting the color and tint of the RGB light source 51 and/or use of special night vision imaging system ("NVIS") compatible lamps may be employed to provide a NVIS compatible lighting light system.

In the example embodiment shown in FIG. 3, light condensing lens 53 is adapted and positioned to collect light from LED lighting 51, focus it and direct it toward scattering screen 54. Alternative embodiments may incorporate a light cavity (not shown) or any other suitable structure that concentrates and directs light, such as, for example, internally reflecting materials or light pipes (not shown).

A scattering screen 54 may be adapted and positioned to diffuse light from RGB LED lighting 51 to provide more spatially uniform illumination. Scattering screen 54 may be formed of plastic, glass, or any suitable material that provides appropriate light scattering, diffusing, and transmissive properties. One example of a material that is able to provide non-Gaussian intensity distribution with high transmission efficiency is offered by Thorlabs of Newton, N.J. as part number ED1-S20, and is suitable in certain embodiments for use as a light scattering screen or diffuser 54.

Color and brightness sensor 55, shown in FIG. 2 may comprise a color and/or brightness sensing device that may be adapted and located anywhere within the path of the illumination source 50 For example, a RGB color and brightness sensor 55 may comprise a photo diode with selective color films and electronic circuitry adapted to convert photo diode current to an electronic signal or digital value that is proportionate to the brightness and chromaticity of light applied to the surface of the sensor. The output of RGB color and brightness sensor 55 may be provided to LED lighting control electronics 52 as part of a control system that regulates color and/or brightness. An example of a digital RGB color and brightness sensor 55 suitable for certain embodiments is available from Taos Inc. of Plano Tex. as part number TCS3414C.

LED lighting control electronics 52 may comprise circuitry adapted to provide a voltage and current source to RGB LED lighting 51 as well as circuitry adapted to receive lighting control and timing signals from electronic circuitry and software 32. Lighting control and timing signals may provide field sequential timing information that synchronizes operation of RGB LED lighting 51 with field sequential video imagery presented on microdisplay 31.

LED lighting control electronics 52 may also receive brightness commands from external controls, whether automatically or by manual adjustment by a user, which may be used to adjust drive current and/or voltage to the RGB LED lighting 51 to brighten or dim the projector illumination source and the resulting image from the microdisplay 31. LED lighting control electronics 52 may also employ pulse width modulation ("PWM") to control, for instance, brightness and chromaticity of RGB LED lighting 51. Brightness, chromaticity, and any other desired properties may be automatically controlled with a closed-loop active electronic control circuit.

Figure 7:
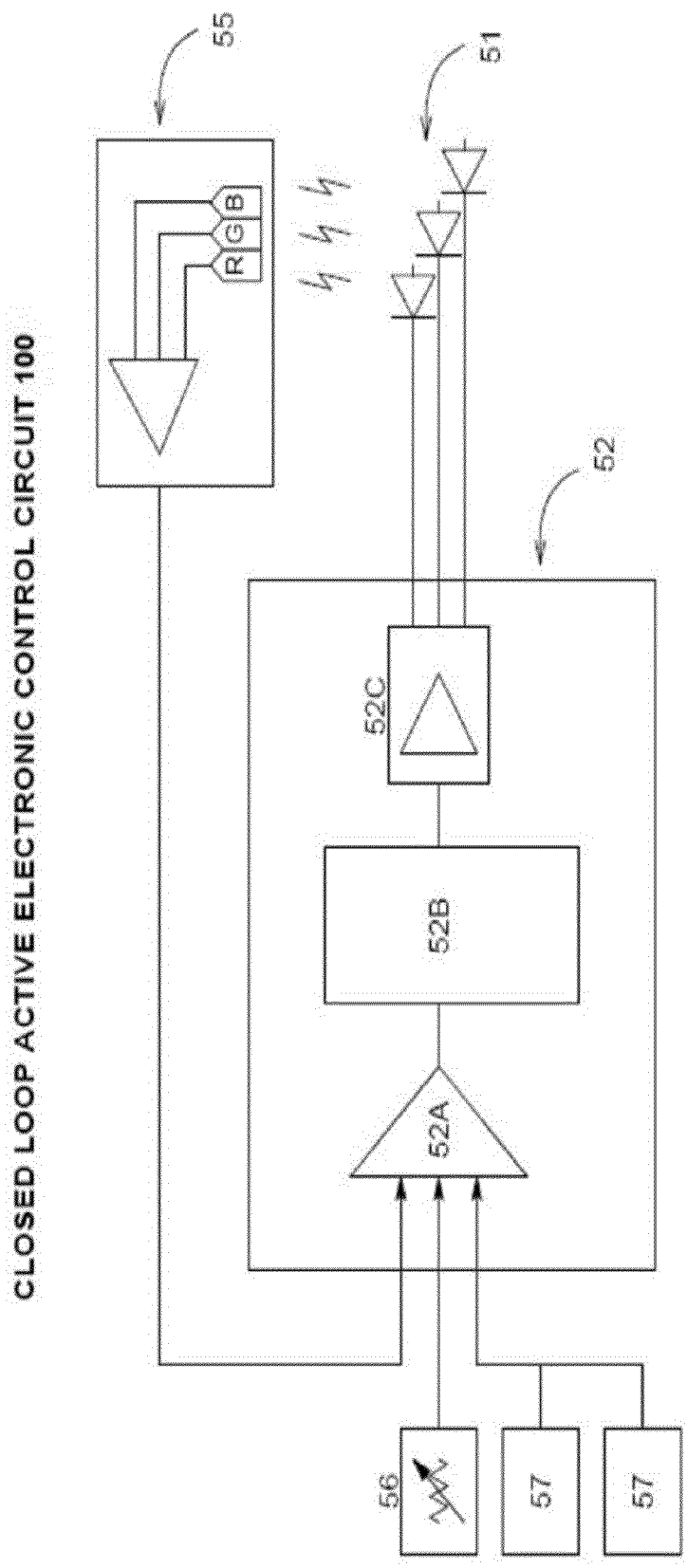
FIG. 7 is a simplified block diagram showing an example closed-loop electronic control circuit that may be used in connection with image systems adapted to utilize a diffused imaging screen according to the invention.

For example, with reference to FIG. 7, a closed loop active electronic control circuit 100 may be provided to adjust and maintain chromaticity according to predetermined values across a range of possible brightness levels. Such an active control circuit may comprise circuitry and firmware that reads values from the RGB color and brightness sensor 55 and compares those to brightness commands provided by external sources, such as a user or another system. The result of this comparison may be used to influence the drive current and/or voltage to the RGB LED lighting 51, to thereby maintain desired brightness and chromaticity.

In the example shown in FIG. 7, a closed-loop active electronic control circuit 100 is provided that may be used to adjust and maintain chromaticity according to predetermined values across a range of possible brightness levels. Such an active control circuit may comprise circuitry and firmware capable of reading values provided by RGB color and brightness sensor 55, brightness commands from external controls 56, and a myriad of other possible signals or inputs 57, including but not limited to temperature sensors, external light sensors, communication links, and the like. Microprocessor 52B and associated firmware may be adapted to provide look-up tables and control algorithms for comparing and correlating values read to predetermined and idealized values for brightness (luminance) and chromaticity (color). The result of this comparison, correlation, and use of preprogrammed look-up tables, algorithms, and control functions may then be used to proportionally influence the control signals provided to the LED drivers 52C, and thereby maintain the desired brightness and chromaticity of RGB LED lighting 51 over a broad range of operating conditions and requirements.

Example Projector Optical Components

The description will now turn to various example projector optical components 40. Projector optical components 40 may include in various example embodiments one or more polarizing beam splitters 41, one or more pre-polarizers 42A, one or more post-polarizers 42B, one or more quarter wave plates 43, one or more collection lenses 44, and one or more mirrors 45, among other elements.

Mirror 45 may comprise a silvered or polished surface selected and oriented to reflect visible light from projector illumination source 50. In the example embodiment shown in FIG. 3, mirror 45 is set at an angle to collect light from projector illumination source 50 and redirect it to provide flat field illumination to collection lens 44. As with the other components, some embodiments with a somewhat different optical path may not require mirror 45.

Collection lens 44 may comprise an optical lens that is adapted to collect and focus light from projector illumination source 50 as reflected by mirror 45. For example, collection lens 44 may concentrate light from illumination source 50 and direct the concentrated light to pre-polarizer 42A before the light passes through to a polarizing beam splitter 41.

Pre-polarizer 42A may polarize light by blocking or reflecting light having a first polarity and transmitting light having a second polarity. In such an embodiment polarized light exits pre-polarizer 42A and enters polarizing beam splitter 41 as shown in FIG. 3.

Polarizing beam splitter 41 may comprise a film (located for instance at the diagonally oriented plane bisecting cube 41) having one or more layers, including at least one layer that is an oriented birefringent material. Polarizing beam splitter 41 may further comprise a polarized reflecting element of the same orientation as the pre-polarizer 42A (located for instance at the same diagonally oriented plane bisecting cube 41). Accordingly, in such an embodiment, as shown in FIG. 3, nearly all of the incoming light from projector illumination source 50 may be reflected approximately 90 degrees by mirror 45 and another approximately 90 degrees internally within polarizing beam splitter 41. This light may then be directed out through quarter wave plate 43 toward microdisplay assembly 30, as shown in FIG. 3. An example of a similar polarizing beam splitter 41 is a 20 mm Polarizing Cube Beam Splitter available from Edmund Optics of Barrington, N.J. as part number 48-573.

A quarter-wave-retarding wave plate 43 may be provided as shown in FIG. 3 to correct the incoming and outgoing polarization states of the light incident on the microdisplay 31, such that the light reflected during the dark (off-state) of the microdisplay 31 is minimized. In particular, the quarter-wave plate 43 may introduce a small phase shift in the polarization state of the light reflected from the microdisplay 31 such that the light that passes through quarter-wave plate 43 is very linearly polarized and will reflect efficiently from the polarizing beam-splitter 41. An example of a similar achromatic quarter-wave-retarding wave plate is available from Bolder Vision Optik of Boulder, Colo.

Like quarter-wave-retarding wave plate 43, a post-polarizer 42B may be adapted and oriented to selectively allow only similarly polarized light to pass through to optical expansion and focusing cell 60. This may improve contrast by helping to block all light except light reflected off microdisplay 31.

Example Microdisplay Assemblies

Example aspects of microdisplay assemblies 30 will now be described. Microdisplay assemblies 30 may include one or more liquid crystal on silicon ("LCOS") reflective microdisplays 31 and corresponding electronic circuitry and software 32. In one embodiment, the LCOS reflective microdisplay 31 is capable of providing full color images. In alternative embodiments, high resolution color imagery may comprise a video projector 20 comprising two or more microdisplays 30 (for instance, individual ones for displaying red, green, blue, and other light, or combinations thereof), and/or a two or more panel microdisplay assembly 30 (such as a three-panel microdisplay) to provide a full color image.

In addition to or instead of using an LCOS reflective microdisplay 31, microdisplay assembly 30 may use other types of reflective microdisplay technologies including but not limited to such as, for example, digital micro-mirror devices ("DMD"), ferro-electric liquid crystal on silicon devices ("FLCOS"), or any other suitable devices. Alternatively, microdisplay assembly 30 may comprise non-reflective displays, including but not limited to transmissive light valves such as liquid crystal displays ("LCD"), or any other suitable non-reflective displays.

Microdisplay assembly 30 may also be described as, or comprise, a spatial light modulator ("SLM").

Alternatively, direct-view display technologies including but not limited to such as LCD type panels and/or emissive organic light emitting diodes ("OLED") may be used with the biocular 80 if the image plane is sized and located to match the biocular input aperture optics and focal point. This may be accomplished by providing a display properly sized and located relative to the input aperture of the biocular, or by using optical expansion or reduction lenses to adjust the size and location of the image plane, as would be apparent to a person of skill in the art. Such a system could thus be configured to avoid the necessity of using the diffused but transmissive optical projection screen 70.

In the embodiments where microdisplay 31 comprises an LCOS reflective microdisplay 31, the microdisplay 31 may comprise an array of pixel electrodes (not shown) that are adapted to apply small electrical charges to a medium of liquid crystal material applied to the surface of an optical mirror. The small electrical charges applied to the pixel electrodes control the polarization of the liquid crystal associated with that pixel and operates as a light modulating polarizing medium when a polarized light source is directed to this surface. Accordingly, each pixel of the microdisplay 31 may be controlled to modulate light reflected from the surface of the microdisplay to represent the intensity of the corresponding pixel of the video image to be displayed.

An LCOS reflective or other microdisplay 31 may utilize a field sequential system adapted to display color images by sequentially presenting an image using each of the red, green and blue ("RGB") colors and illuminating the corresponding portions of each sequential image with the appropriate (RGB) color. A spatial light system may also or alternatively be employed by simultaneously turning on all three LED's to create a substantially white light source. A spatial light system compatible with night vision imaging systems ("NVIS") may be employed by adjusting the color and tint of the RGB light source and/or by use of lamps specially adapted to be used with NVIS.

An example of an LCOS reflective microdisplay 31 suitable for certain embodiments is the Aurora (OVT) full color sequential HED-5216 LCOS microdisplay with a resolution of 1280×768. This product is available at the time of writing from Holoeye Corporation, located at 3132 Tiger Run Court, Suite 112, Carlsbad, Calif. 92010.

An example embodiment of the electronic circuit and software 32 in the microdisplay assembly 30 will now be described. Input signals, including video input signals, may be provided to the electronic circuit and software 32 from any suitable source, including thermal imaging systems, day sight video cameras, night vision systems, and computer generated graphics, among others (not shown). When an active video input signal comprising encoded video image information is transmitted to electronic circuit and software 32, electronic circuit and software 32 may translate and convert this signal to a digital representation of the encoded video image. This digital image is then converted to electrical control signals used to manipulate individual pixels of the microdisplay 31, which may comprise an LCOS reflective microdisplay. Electronic circuit and software 32 may also decode video signal timing information from the active video input signal and use that information to generate and deliver synchronization signals to other video projector electronics, such as the projector illumination source 50.

Electronic circuitry and software 32 may in certain example embodiments comprise a printed circuit board (shown in FIG. 3 at 32) upon which LCOS reflective microdisplay 31 may be attached. In certain alternative embodiments, LCOS reflective microdisplay 31 may be connected with the printed circuit board of electronic circuitry and software 32, via a flex cable or any other suitable interconnection system (not shown). Electronic circuitry and software 32 may further comprise multiple LSIC's (Large Scale Integrated Circuits), FPGA's (Field Programmable Gate Arrays), and other complex active electronics. Electronic circuitry and software 32 may also comprise software and firmware that include algorithms and control logic adapted to operate microdisplay 31. Electronic circuitry and software 32 may additionally generate and deliver lighting control and timing signals to LED lighting control electronics 52 to synchronize operation of RGB LED lighting 51. The underlying technical details regarding electronic circuit and software 32 that may be desired in various embodiments will be apparent to persons of skill in the art and are not repeated here in order to maintain the focus of this description on the overall system 10.

Example Optical Expansion And Focusing Cells

Optical expansion and focusing cells 60 will now be described. In certain embodiments an optical expansion and focusing cell 60 may comprise one or more relay lenses 61. A relay lens 61 may be a fixed lens or other optical element adapted to project an optical image to the real image plane of a diffused but transmissive optical projection screen 70, where the optical image was projected from microdisplay assembly 30 and through projector optical components 40.

In certain example embodiments, optical expansion and focusing cell 60, when coupled with the other elements of microdisplay video projector 20, may provide an image to the real image plane of a diffused but transmissive optical projection screen 70, in a number of formats including but not limited to:

(A) 1.412"×0.794", 1.620" Diagonal, 2.945 Magnification;
(B) 1.575"×0.886", 1.807" Diagonal, 3.286 Magnification;
(C) 1.620"×0.911", 1.859" Diagonal, 3.379 Magnification; and
(D) 1.760"×0.990", 2.019" Diagonal, 3.672 Magnification.

An example of a similar optical expansion and focusing cell 60, with a 25 mm compact-fixed-focal-length lens is available from Edmund Optics of Barrington, N.J. as part number NT59-871.

Example Bioculars

Turning to biocular 80, in certain embodiments biocular 80, may comprise one or more lenses or other structures that magnify the video image on the diffused but transmissive optical projection screen 70, and presents this image to both eyes of the user as a large virtual image at infinite focus. For example, biocular 80 may comprise diffractive optical components, magnifying lenses, prismatic lenses, and other optical elements adapted to generate a large virtual image of the image presented on the diffused but transmissive optical projection screen 70, described below.

A similar biocular has been described in U.S. Pat. No. 5,151,823 to Chen. An embodiment in Chen may be suitable for adaptation and use in certain embodiments, namely the embodiment shown in FIG. 2 of Chen, which is described as a biocular having a three-element biocular eyepiece system, including a first optical element having at least one diffractive surface, a second optical element having a refracting convex surface and a refracting concave surface, and a third optical element having a refracting convex surface.

In certain embodiments image control and display systems 10 are adapted to be coupled with the head of a user so that the user's head will move with and stay in relatively fixed alignment with biocular 80, so that the user can readily maintain a steady view of biocular 80, even during movements of a structure that biocular 80 may be attached to, such as a vehicle, aircraft, or the like (not shown). This may be accomplished by providing compliant material, such as low durometer elastomer, positioned between the biocular 80 and the head of a user (not shown) viewing an image presented by the biocular.

For example, as shown in FIG. 3, a brow pad 90 or other head or face support structure 91 formed at least in part from compliant material and adapted to support at least a portion of the head of a user (not shown) may be provided. The brow pad 90 or other head or face support structure 91 may be connected with the image display and control system 10 by being connected directly to the biocular 80 or to another nearby structure that moves with the biocular 80 during use. For example, in certain embodiments a brow pad 90 may be provided on the hull of a vehicle to which the biocular is connected, such that the user may rest their forehead on the brow pad 90 while viewing the image presented by biocular 80. Alternatively or additionally, compliant material may be provided near the viewing portion of the biocular 80 for the user to rest their face while viewing the image presented by the biocular 80, as shown by the face support pad 91 in FIG. 3. Any combination of brow pads 90, face support pad 91, or similar compliant material may be used to adapt image control and display systems 10 so that the biocular 80 is mechanically coupled with a user during use, so that the user's head and biocular 80 move together in a synchronized fashion during use. When used in this sense, "mechanically coupled" does not necessarily mean rigidly fixed, but means sufficiently connected to prevent excessive relative movement between the user's head and biocular 80, such as when a user rests their forehead on a brow pad 90 affixed to structure connected with biocular 80. This can be especially useful in tactical environments such as military applications, where a user may need to carefully view a display while the vehicle moves and engages in combat. Furthermore this adaptation to provide a stabilized viewing image while a vehicle is in motion may also reduce the likelihood of the user experiencing motion sickness or other undesired effects due to unsynchronized movement of the user and display during viewing.

Example Diffused But Transmissive Optical Projection Screens

Next, examples of diffused but transmissive optical projection screens 70 will be described. Diffused but transmissive optical projection screens 70 may comprise a polarization-independent scattering screen with optical qualities optimized to present video imagery to a biocular 80 from a microdisplay video projector 20. Example optical qualities that may be considered for optimization include but are not limited to lambertian dispersion, light transmission, and low distortion.

Diffused but transmissive optical projection screens 70 may be formed from any materials that provide the diffused but transmissive qualities required to present high resolution video imagery to the biocular. In certain embodiments transmissive optical projection screens 70 may be formed from any or all of polymers, polytetrafluoroethylene (PTFE), acetal copolymer films, polymer dispersed liquid crystal, glass, or any other suitable material. Various materials for diffused but transmissive optical projection screens 70 may be manufactured and formed using heating, cooling, pressing, extrusion, adhesive bonding, and the like.

With reference to FIG. 5, diffused but transmissive optical projection screen 70 may in certain embodiments be sized to be as large as or larger than the input aperture of the biocular 80. Diffused but transmissive optical projection screen 70 may in various embodiments be bonded, laminated, or otherwise mounted to glass, plastic, or any other suitable substrate, to provide a mounting structure adapted to be attached to or aligned with the input aperture of biocular 80.

Figure 8:
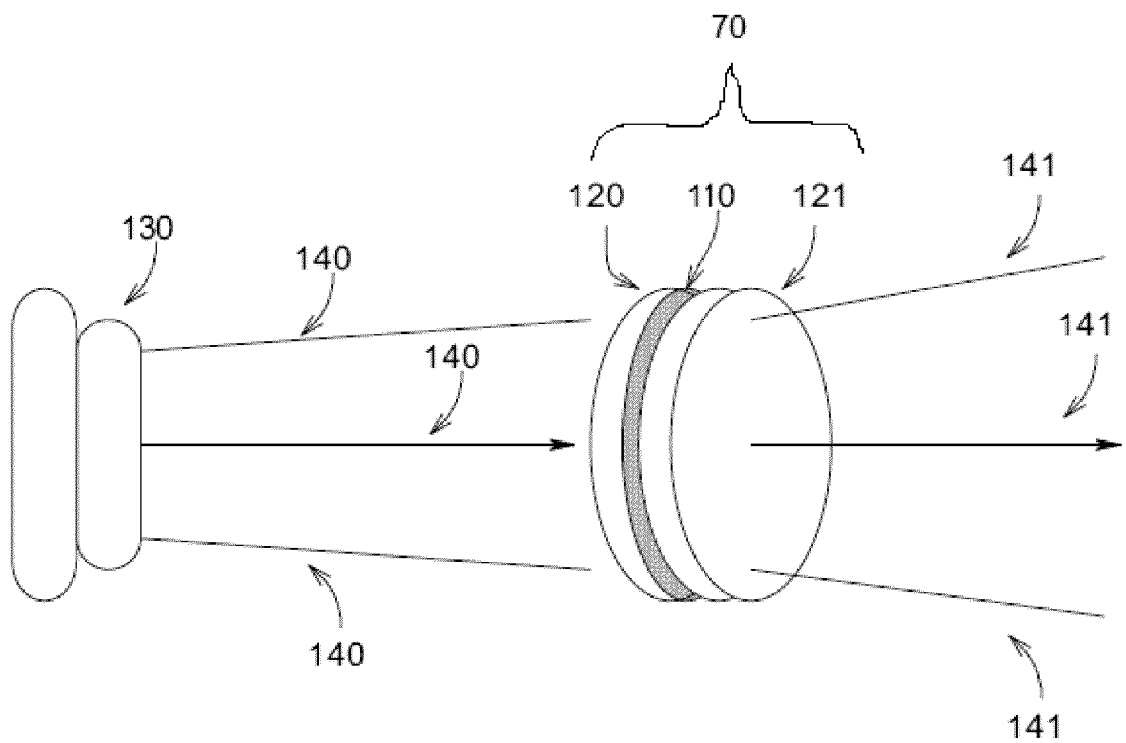
FIG. 8 is a perspective view of an example diffused imaging screen assembly according to the invention, including an image source, a diffused but transmissive optical image projection screen, means to mount the optical image projection screen, and optical light paths.
Figure 9:
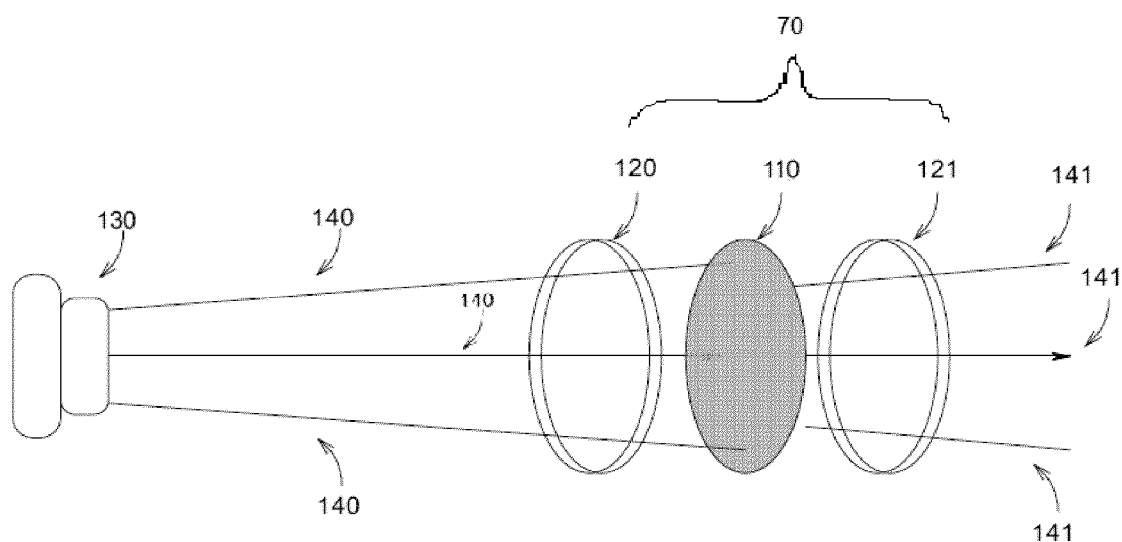
FIG. 9 is an exploded perspective view of the example diffused imaging screen assembly of FIG. 8.

For example, with reference to FIGS. 8 and 9, shown is an example embodiment of an optical image projection system comprising an image source 130, a diffused but transmissive optical image projection screen 70 comprising a thin sheet of Acetal 110 positioned between layers 120, 121 of optical glass or plastic substrate. Example optical light paths 140 are shown projecting from the image source 130 to the diffused but transmissive optical image projection screen 70, which then projects optical light paths 141.

With reference to FIGS. 8 and 9, optical image projection screen 110 may comprise a thin sheet of Acetal polymer, for instance approximately 0.001 inch to 0.020 inch thick, sized to accommodate the desired optical image size projected from image source 130. Optical glass or plastic substrate 120 and 121 may provide a planar or other supporting surface to which the optical image projection screen 110 may be attached or sandwiched between. Optical light paths 140 and 141 represent the light path from projected image source 130, through optical glass or plastic substrate 120, on to a proximate side of optical image projection screen 110, away from a distal side of optical image projection screen 110, and out through optical glass or plastic substrate 121.

Optical glass or plastic substrate 120 and 121 may comprise ultraviolet (UV), anti-reflecting (AR), and optical light filters or coatings to improve optical performance and reduce potentially damaging effects of UV and other radiation on optical image projection screen 110.

Optical glass or plastic substrate 120 may not be required, for instance in applications where optical image projection screen 110 is bonded directly to optical glass or plastic substrate 121. Optical glass or plastic substrate 120 and 121 may also not be required in applications where optical image projection screen 110 is manufactured to provide a thicker outer edge allowing independent mounting. Optical glass or plastic substrate 120 and 121 may likewise not be required in applications where optical image projection screen 110 is mounted by means other than with use of an optical glass or plastic substrate.

Figure 10:
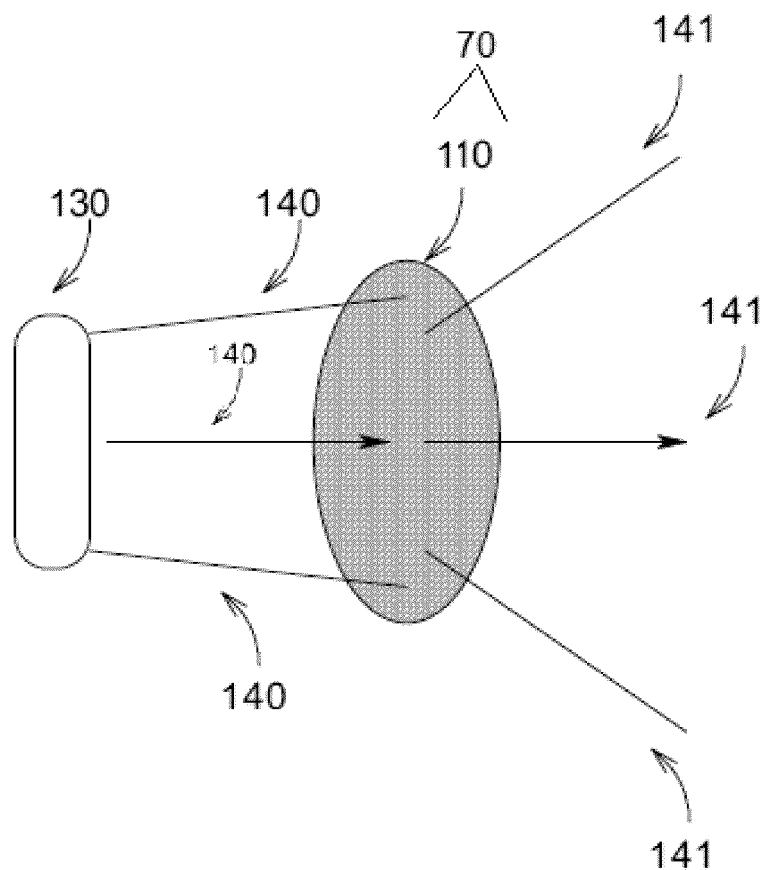
FIG. 10 is a perspective view of another example diffused imaging screen assembly according to the invention.

With reference to FIG. 10, shown is an example embodiment of an alternative diffused lighting system consisting of light source 130, optical light diffusing screen 70 made from an Acetal material 110, and optical light path 140 and 141. With reference to FIG. 10, light source 130 may be any number or type of light sources including but not limited incandescent, fluorescent, halogen or others as is known in the art. Optical light diffusing screen 70 may comprise a sheet or fabricated part made of an Acetal type polymer of an appropriate thickness to provide the desired optical diffusion and transmission properties suitable for the particular application. Diffused optical light paths 140 and 141 represent the light path of the light source 130, entering through a proximate side 140 of the light diffusing screen 70, and exiting through a distal side 141 of the diffused lighting system.

Suitable Acetal polymers for optical light diffusing screen 70 may include Polyoxymethylene (commonly referred to as POM and also known as polyacetal or polyformaldehyde), an engineering thermoplastic typically used in precision parts that require high stiffness, low friction and excellent dimensional stability. POM is available from Ticona Hostaform under the trademark Celcon, from DuPont under the trademark Delrin, from Polyplastic under the trademark Duracon, from Korea Engineering Plastics under the trademark Kepital, from Mitsubishi under the trademark Jupital, and from BASF under the trademark Ultraform.

POM is characterized by its high strength, hardness and rigidity to −40° Celsius. POM is intrinsically opaque white, due to its high crystalline composition, but it is available in all colors. POM has a density of $\rho=1.410$-$1.420$ g/cm3. POM homopolymer is typically a semi-crystalline polymer (75-85% crystalline) with a melting point of 175° Celsius. The POM copolymer typically has a slightly lower melting point of about 162-173° Celsius. POM is a tough material with a very low coefficient of friction. However, it is susceptible to polymer degradation catalyzed by acids, which is why both polymer types are stabilized. Both homopolymer and copolymer have chain end groups (introduced via end capping) which resist depolymerization. With the copolymer, the second unit normally is a C2 (ethylene glycol) or C4 (1,4-butanediol) unit, which is introduced via its cyclic acetal (which can be made from the diol and formaldehyde) or cyclic ether (e.g. ethylene oxide). These units resist chain cleavage, because the O-linkage is then no longer an acetal group, but an ether linkage, which is stable to hydrolysis. POM is sensitive to oxidation, and an anti-oxidant is normally added to molding grades of the material. Typical characteristics of POM include: high abrasion resistance; low coefficient of friction; high heat resistance; good electrical and dielectric properties; and low water absorption.

Different manufacturing processes may be used to produce the homopolymer and copolymer versions of POM. To make polyoxymethylene homopolymer, anhydrous formaldehyde must be generated. The principal method is by reaction of the aqueous formaldehyde with an alcohol to create a hemiformal, dehydration of the hemiformal/water mixture (either by extraction or vacuum distillation) and release of the formaldehyde by heating the hemiformal. The formaldehyde is then polymerized by anionic catalysis and the resulting polymer stabilized by reaction with acetic anhydride. A typical example polyoxymethylene homopolymer is DuPont's Delrin.

To make polyoxymethylene copolymer, formaldehyde is generally converted to trioxane. This is done by acid catalysis (either sulfuric acid or acidic ion exchange resins) followed by purification of the trioxane by distillation and/or extraction to remove water and other active hydrogen containing impurities. Typical copolymers are Hostaform from Ticona and Ultraform from BASF.

The co-monomer is typically dioxolane but ethylene oxide can also be used. Dioxolane is formed by reaction of ethylene glycol with aqueous formaldehyde over an acid catalyst. Other diols can also be used. Trioxane and Dioxolane are polymerized using an acid catalyst, often boron trifluoride etherate, BF3 OEt2. The polymerization can take place in a non-polar solvent (in which case the polymer forms as a slurry) or in neat trioxane (e.g. in an extruder). After polymerization, the acidic catalyst must be deactivated and the polymer stabilized by melt or solution hydrolysis in order to remove the unstable end groups. Stable polymer is melt compounded, adding thermal and oxidative stabilizers and optionally lubricants and miscellaneous fillers.

While POM is described in detail above as an example, any suitable Acetal material may be used for optical light diffusing screen 70.

Although exemplary embodiments and applications of the invention have been described herein, there is no intention that the invention be limited to these exemplary embodiments and applications or to the manner in which the exemplary embodiments and applications operate or are described herein. Indeed, many variations and modifications to the exemplary embodiments are possible, as will be apparent to persons of skill in the art. Accordingly, the invention is limited only by the scope of the claims. Unless otherwise specified, the phrase "adapted to" indicates characteristics of structure, namely that that the structure comprises the necessary characteristics as disclosed or suggested herein and therefore has been particularly adapted as stated. Accordingly, unless otherwise specified, the phrase "adapted to" does not indicate a method or steps.

What is claimed is:

1. A diffused but transmissive optical projection screen adapted for use with an electronic image display system that projects an image onto a first proximate side of the diffused but transmissive optical projection screen such that the image is viewable on a second distal side of the diffused but transmissive optical projection screen, the diffused but transmissive optical projection screen comprising a sheet of diffusive material consisting essentially of Acetal.

2. The diffused but transmissive optical projection screen of claim 1, wherein the diffused but transmissive optical projection screen comprises Polyoxymethylene.

3. The diffused but transmissive optical projection screen of claim 1, wherein the diffused but transmissive optical projection screen comprises Polyoxymethylene copolymer.

4. The diffused but transmissive optical projection screen of claim 1, wherein the diffused but transmissive optical projection screen comprises Polyoxymethylene homopolymer.

5. The diffused but transmissive optical projection screen of claim 1, wherein the diffused but transmissive optical projection screen comprises Polyacetal.

6. The diffused but transmissive optical projection screen of claim 1, wherein the diffused but transmissive optical projection screen comprises Polyformaldehyde.

7. The diffused but transmissive optical projection screen of claim 1, wherein the diffused but transmissive optical projection screen comprises a sheet of Acetal approximately 0.001 inch to 0.020 inch thick.

8. The diffused but transmissive optical projection screen of claim 1, further comprising a layer of optical glass adjacent either: the first proximate side; or the second distal side; or both.

9. The diffused but transmissive optical projection screen of claim 1, further comprising a layer of plastic substrate adjacent either: the first proximate side; or the second distal side; or both.

10. The diffused but transmissive optical projection screen of claim 1, further comprising a layer of optical glass adjacent the first proximate side, and a layer of plastic substrate adjacent the second distal side.

11. The diffused but transmissive optical projection screen of claim 1, further comprising a layer of plastic substrate adjacent the first proximate side, and a layer of optical glass adjacent the second distal side.

12. The diffused but transmissive optical projection screen of claim 1, further comprising a layer of optical glass adjacent and bonded to either: the first proximate side; or the second distal side; or both.

13. The diffused but transmissive optical projection screen of claim 1, further comprising a layer of plastic substrate adjacent and bonded to either: the first proximate side; or the second distal side; or both.

14. The diffused but transmissive optical projection screen of claim 1, further comprising an ultraviolet (UV) light filter thereon.

15. The diffused but transmissive optical projection screen of claim 1, further comprising an anti-reflecting (AR) coating thereon.

16. A diffused but transmissive light screen adapted to diffuse light projected onto a first proximate side of the diffused but transmissive light screen such that the light is emitted in a diffused pattern on a second distal side of the diffused but transmissive light screen, wherein the diffused but transmissive light screen comprises:

a sheet of diffusive material consisting essentially of: Acetal; Polyoxymethylene; Polyacetal; or Polyformaldehyde.

17. The diffused but transmissive light screen of claim 16, wherein the sheet of material is approximately 0.001 inch to 0.020 inch thick.

18. A method of constructing a diffused but transmissive optical projection screen adapted for use with an electronic image display system that projects an image onto a first proximate side of the diffused but transmissive optical projection screen such that the image is viewable on a second distal side of the diffused but transmissive optical projection screen, comprising the steps of:

forming the screen at least in part from a sheet of diffusive material consisting essentially of Acetal; Polyoxymethylene; Polyacetal; or Polyformaldehyde; the screen having a first proximate side and a second distal side separated by a thickness;

selecting the thickness between approximately 0.001 inch to 0.020 inch to provide a predetermined balance between transmissivity and diffusion of the image through the screen.

19. The method of claim 18, further comprising the steps of:

providing a layer of optical glass adjacent to either: the first proximate side; or the second distal side; or both.

20. The method of claim 18, further comprising the steps of:

providing a layer of plastic substrate adjacent to either: the first proximate side; or the second distal side; or both.

* * * * *